(12) United States Patent
Krishnan et al.

(10) Patent No.: US 8,571,309 B2
(45) Date of Patent: Oct. 29, 2013

(54) SYSTEM AND METHOD OF IMAGE UPSAMPLING

(75) Inventors: Shankar Krishnan, Chatham, NJ (US); James Klosowski, Ridgefield, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 66 days.

(21) Appl. No.: 13/296,417

(22) Filed: Nov. 15, 2011

(65) Prior Publication Data

US 2013/0121568 A1    May 16, 2013

(51) Int. Cl.
G06K 9/00 (2006.01)

(52) U.S. Cl.
USPC .......................................................... 382/162

(58) Field of Classification Search
None
See application file for complete search history.

(56) References Cited

U.S. PATENT DOCUMENTS

| | | | |
|---|---|---|---|
| 2006/0088101 A1* | 4/2006 | Han et al. | 375/240.16 |
| 2007/0139239 A1* | 6/2007 | Keehr | 341/143 |
| 2007/0165949 A1* | 7/2007 | Sinop et al. | 382/173 |
| 2008/0137990 A1* | 6/2008 | Ward | 382/299 |
| 2010/0011268 A1* | 1/2010 | Sinop et al. | 714/746 |
| 2010/0074552 A1* | 3/2010 | Sun et al. | 382/264 |
| 2011/0274329 A1* | 11/2011 | Mathew et al. | 382/131 |
| 2012/0147205 A1* | 6/2012 | Lelescu et al. | 348/218.1 |
| 2012/0306904 A1* | 12/2012 | Francois et al. | 345/589 |
| 2012/0328213 A1* | 12/2012 | Yamamoto et al. | 382/300 |

OTHER PUBLICATIONS

Adams, Andrew et al., "Fast High-Dimensional Filtering Using the Permutohedral Lattice," Computer Graphics Forum (EG 2010 Proceedings), vol. 29, No. 2, 2010, pp. 753-762.
Adams, Andrew et al., "Gaussian KD-Trees for Fast High-Dimensional Filtering," ACM Transactions on Graphics (SIGGRAPH), vol. 28, No. 3, 2009, pp. 1-12.
Chen, Jiawen et al., "Real-time Edge-Aware Image Processing with the Bilateral Grid," ACM Transactions on Graphics (SIGGRAPH), vol. 26, No. 103, 2007, 9 pages.
Conway, J.H. et al., "Sphere Packings, Lattices and Groups," Springer-Verlag, Sep. 16, 1998, 112 pages.
Durand, Fredo et al., "Fast Bilateral Filtering for the Display of High-Dynamic-Range Images," ACM Transactions on Graphics (SIGGRAPH), vol. 21, 2002, pp. 257-266.
Klosowski, James T. et al., "Real-time image deconvolution on the GPU," SPIE-IS&T Electronic Imaging: Parallel Processing for Imaging Applications, 2011, 15 pages.
Krishnan, Dilip et al., "Fast Image Deconvolution using Hyper-Laplacian Priors," Neural Information Processing Systems, 2009, pp. 1033-1041.

(Continued)

Primary Examiner — Barry Drennan
Assistant Examiner — Feng Niu
(74) Attorney, Agent, or Firm — Toler Law Group, PC (57) ABSTRACT

A method includes receiving an image having a first resolution and generating an upsampled image having a second resolution based on the image. A multi-dimensional data structure corresponding to a multi-dimensional image space is generated from the upsampled image. Each node of the data structure is determined based on a weighted sum of values of one or more pixels in the upsampled image. Each of the one or more pixels corresponds to a pixel in the received image and is located within a region of the image space having a vertex defined by the node. A filter modifies the values of the nodes and a second upsampled image is generated based on the modified values. Each pixel of the second upsampled image not corresponding to a pixel in the received image is determined based on a weighted sum of the modified values of one or more nodes.

20 Claims, 8 Drawing Sheets

(56) References Cited

OTHER PUBLICATIONS

Paris, Sylvain et al., "A Fast Approximation of the Bilateral Filter using a Signal Processing Approach," International Journal of Computer Vision, vol. 81, 2009, pp. 24-52.

Paris, Sylvain et al., "Bilateral Filtering: Theory and Applications," Foundations and Trends in Computer Graphics and Vision, vol. 4, No. 1, 2009, pp. 1-73.

Shan, Qi et al., "Fast Image/Video Upsampling," ACM Transcations on Graphics (SIGGRAPH ASIA), vol. 27, No. 153, 2008, 7 pages.

Takeda, Hiroyuki et al., "Higher Order Bilateral Filters and Their Properties," SPIE Conference Series: Computational Imaging V, 2007, 9 pages.

Takeda, Hiroyuki et al., "Kernel Regression for Image Processing and Reconstruction," IEEE Transactions on Image Processing, vol. 16, No. 2, 2007, pp. 349-366.

\* cited by examiner

SYSTEM AND METHOD OF IMAGE UPSAMPLING

FIELD OF THE DISCLOSURE

The present disclosure is generally related to image upsampling.

BACKGROUND

As high-resolution (e.g., high definition (HD)) displays become common, image/video upsampling has been used with such displays. For example, image/video upsampling may be used to convert lower-resolution (e.g., standard definition (SD)) images/video to higher resolution (e.g., HD) images/video. Typically, upsampling may be performed via interpolation. For example, given an original image of 100× 100 pixel resolution, generating an upsampled image that has a resolution of 200×200 may include "spreading out" the 100×100 original pixels and determining interpolated values for "gap" pixels in the upsampled image.

In interpolation, a model used to describe the relationship between high-resolution pixels and low-resolution pixels may affect the performance of the interpolation. Typically, an interpolation algorithm determines the value of a pixel in the higher resolution image as a weighted average of the values in the neighborhood of the pixel in the lower resolution image. The weighted average scheme enables formulation of the interpolation algorithm using linear convolution techniques. However, such linear interpolation schemes that are based on space-invariant models may fail to capture the changing statistics around edges and may consequently produce interpolated images with blurred edges and annoying artifacts. Despite these drawbacks, linear interpolation remains popular due to its computational simplicity.

Blurring in the upsampled image may be removed via iterative feedback-controlled de-blurring. However, this type of de-blurring may be slow due to repeated application of a de-blurring operator and may therefore be unsuitable for real-time video upsampling.

DETAILED DESCRIPTION

A system and method to upsample image/video with improved output image quality and reduced computational complexity is disclosed. The disclosed techniques may utilize an adapted filtering framework that is sensitive to edges and other local image features and that uses a multi-dimensional lattice data structure for computation. The disclosed techniques may be used for real time or near-real time image upsampling (e.g., upsampling of SD video to HD video).

The disclosed techniques may provide various advantages over certain interpolation and other upsampling schemes. As used herein, the notation $I_p$ represents the value of an image at a pixel p. F[I] denotes the output of a filter applied to an image I. S denotes the set of pixel locations in the image (the spatial domain), while R refers to the set of image intensities (or range domain). In practical situations, due to quantization and digital imaging limitations, both S and R may be discrete sets. Further, |•| denotes the absolute value of a real number and ||•|| denotes the $L_2$ norm (or Euclidean distance).

An image filtered by a Gaussian Filter (denoted GF) may be represented by the expression:

$$GF[I]_p = \sum_{q \in S} G_\sigma(\|p - q\|) I_q \qquad \text{(Equation 1.1)}$$

where $G_\sigma(x)$ denotes the two-dimensional Gaussian kernel:

$$G_\sigma(x) = \frac{1}{2\pi\sigma^2} \exp\left(-\frac{x^2}{2\sigma^2}\right). \qquad \text{(Equation 1.2)}$$

Gaussian filtering is a weighted average of the intensity of the adjacent pixels with weights decreasing as the spatial distance decreases to a center pixel p. The weight corresponding to pixel q is defined by the Gaussian kernel $G_\sigma(\|p\text{-}q\|)$ where σ is a parameter defining the neighborhood size.

Bilateral filtering is an example of an image processing algorithm that can be considered in the framework of high-dimensional Gaussian filtering. Bilateral filtering may attempt to preserve edges in image data as pixel values are smoothed. In bilateral filtering, for a first pixel to influence a second pixel, the first pixel should not only occupy a nearby spatial location but should also have a similar intensity value as the second pixel. The bilateral filter (BF) may be represented by the expression:

$$BF[I]_p = \frac{1}{W_p} \sum_{q \in S} G_{\sigma_s}(\|p - q\|) G_{\sigma_r}(|I_p - I_q|) I_q \qquad \text{(Equation 1.3)}$$

where parameters $\sigma_s$ and $\sigma_r$ specify the neighborhood of the filter in the spatial and range domains, respectively, and where the normalization factor $W_p$ ensures that the pixel weights sum to 1:

$$W_p = \sum_{q \in S} G_{\sigma_s}(\|p - q\|) G_{\sigma_r}(|I_p - I_q|). \qquad \text{(Equation 1.4)}$$

Parametric image processing methods typically rely on a specific signal model of interest and seek to compute parameters of the model in the presence of noise. In contrast, non-parametric methods rely on the data itself to dictate the structure of the model. Let f( ) denote a continuous function generating an image and assume that f is locally smooth to some order k. Given image information on L pixels (corresponding to a low-resolution image), if $y_i$ is the image intensity at a pixel $x_i=(x_{(1)i},x_{(2)i})$, then the known data can be expressed as $$y_i = f(x_i) + \eta_i, 1 \leq i \leq L \quad \text{(Equation 2.1)}$$

where $\eta_i$ defines noise and is generated by independent and identically distributed zero mean random variables.

Based on the smoothness assumption for f, the function value at any point x can be estimated using a bivariate Taylor's series expansion around the point. Specifically:

$$f(x_i) \approx \sum_{\beta=0}^{k} \frac{D^\beta f(x)}{\beta!} (x_i - x)^\beta \quad \text{(Equation 2.2)}$$

where $$D^\beta f = \frac{\delta^\beta f}{\delta x_{(1)}^{\beta_1} \delta x_{(2)}^{\beta_2}}, \beta \leq k, \beta = \beta_1 + \beta_2,$$

$$\beta! = \beta_1! \beta_2! \text{ and } x^\beta = x_{(1)}^{\beta_1} x_{(2)}^{\beta_2}.$$

For the case of k=2:

$$f(x_i) = f(x) + \{\nabla f(x)\}^T (x_i - x) + \frac{1}{2} (x_i - x)^T \{Hf(x)\} (x_i - x) + \ldots$$

$$f(x_i) = \alpha_0 + \alpha_1^T (x_i - x) + \frac{1}{2} \alpha_2^T \text{vec}((x_i - x)(x_i - x)^T) + \quad \text{(Equation 2.3)},$$

where $\nabla$ and H are gradient and Hessian operators, and vec( ) is the vectorization operator. The a terms can be estimated using a least squares formulation. Since this is a local estimate, nearby samples may be weighted more than farther away samples. Thus, the optimization problem may be defined as $$\min_{\alpha_n} \sum_{i=1}^{L} \left( y_i - \alpha_0 - \alpha_1^T (x_i - x) - \frac{1}{2} \alpha_2^T \text{vec}((x_i - x)(x_i - x)^T) - \ldots \right)^2 K_\sigma(x_i - x). \quad \text{(Equation 2.4)}$$

$K_\sigma$ is a kernel function that penalizes samples far away (in the spatial domain) from the origin. This kernel function may be selected to satisfy a few conditions, such as K( ) is greater than or equal to zero everywhere, K( ) is unimodal with a maximum at the origin, K( ) is symmetric about the origin, and that the first and second moments of K( ) are zero and u, respectively. It will be appreciated that one example of such a kernel function is the Gaussian function $G_\sigma(x)$. For upsampling, k=0, which leads to the a term:

$$\alpha_0 = f(x) = \frac{\sum_{i=1}^{L} y_i K_\sigma(x_i - x)}{\sum_{i=1}^{L} K_\sigma(x_i - x)}. \quad \text{(Equation 2.5)}$$

However, the above approach, while penalizing samples farther away in the spatial domain, may not be sensitive to local image features. Thus, similar to interpolation methods, the above approach may suffer from blurring and other annoying artifacts.

Instead, if the kernel function is changed to not only depend on the spatial domain but also the range domain, the kernel function may adapt to local image features such as edges. Let $\sigma_s$ be the spatial variance of the kernel and $\sigma_r$ be the range variance. Given an image sample y=f(x), let the variable z denote $(x/\sigma_s, y/\sigma_r) \in S \times R$. The least squares formulation then becomes:

$$\min_{\alpha_n} \sum_{i=1}^{L} \left( y_i - \alpha_0 - \alpha_1^T (x_i - x) - \frac{1}{2} \alpha_2^T \text{vec}((x_i - x)(x_i - x)^T) - \ldots \right)^2 K_\sigma(z_i - z) \quad \text{(Equation 2.6)}$$

and the solution for k=0 is $$\alpha_0 = f(x) = \frac{\sum_{i=1}^{L} y_i K_1(z_i - z)}{\sum_{i=1}^{L} K_1(z_i - z)}. \quad \text{(Equation 2.7)}$$

It will be appreciated that if the Gaussian function is used as the kernel, the above expression becomes the previously described bilateral filter BF (see Equation 1.3). Further, the subscript of K has changed from σ to 1, due to the transformation to z. As k changes, different expressions for the value of $\alpha_0$ are obtained. This may be interpreted as a generalization of a bilateral filter.

It will also be noted that in the context of upsampling, the expression on the right-hand side of the equation has a dependence on z, and therefore y, inside the kernel function. However, because we are trying to estimate y using the weighted least squares optimization, this leads to a circular dependency. To break the circular dependency, an initial estimate of y may be obtained using another upsampling scheme, such as linear interpolation.

Accordingly, the present disclosure describes an upsampling system and method that generates an initial upsampled image from a low-resolution input image using an interpolator (e.g., a bi-cubic interpolator). To generate an improved upsampling, the initial upsampled image is then subjected to adaptive filtering. Adaptive filtering may include the steps of "splatting," "filtering," and "slicing" using a multi-dimensional lattice structure to generate a second upsampled image. The second upsampled image may be of higher quality than the first upsampled image.

During splatting, a first upsampled (e.g., interpolated) image may be used to populate a multi-dimensional lattice structure. Notably, only pixels in the first upsampled image that correspond to pixels from the original (e.g., low-resolution) image may be used during splatting. Each pixel from the original image may contribute (via barycentric weighting) to the nodes that define the vertices of a multi-dimensional region (i.e., a simplex) that the pixel belongs to. During filtering, a filter (e.g., a 1-2-1 filter) may be applied to blur (i.e., smooth) the values of the nodes in the lattice. Slicing may be considered the reverse of splatting. During slicing, the blurred values in the nodes may contribute via barycentric weights to the "gap" pixels in a second upsampled image. The second upsampled image may optionally be subjected to a single-iteration image deconvolution (i.e., de-blurring) algorithm.

The disclosed techniques may employ a data-adaptive kernel framework for image/video upsampling that is sensitive to fast changing image statistics around edges and other image features. The disclosed techniques may be implemented using a graphics processing unit (GPU) to achieve real time or near-real time performance rates of approximately 25 frames per second on 480 p video (progressive scan video with 480 lines of vertical resolution, usually 640×480 pixels in 4:3 aspect ratio material and 854×480 pixels in 16:9 aspect ratio material).

In a particular embodiment, a method includes receiving an image having a first resolution and generating a first upsampled image based on the image, where the first upsampled image has a second resolution that is greater than the first resolution. The method also includes generating a multi-dimensional data structure corresponding to a multi-dimensional image space based on the first upsampled image. Each node of the multi-dimensional data structure has a value that is determined based on a weighted sum of values of one or more pixels in the first upsampled image, where each of the one or more pixels corresponds to a pixel in the received image and is located within a region of the multi-dimensional image space that has a vertex defined by the node. For example, each contributing pixel that is located within a particular multi-dimensional simplex may contribute to the nodes of the multi-dimensional data structure that make up the vertices of the particular multi-dimensional simplex. The method further includes applying a filter to modify the values of the nodes of the multi-dimensional data structure and generating a second upsampled image based on the modified values of the nodes in the multi-dimensional data structure. Each pixel of the second upsampled image that does not correspond to a pixel in the received image has a pixel value that is determined based on a weighted sum of the modified values of one or more nodes of the multi-dimensional data structure.

In another particular embodiment, a system includes a processor and an interpolator executable by the processor to generate a first upsampled image based on a received image. The received image has a first resolution and the first upsampled image has a second resolution that is greater than the first resolution. The apparatus also includes a splatter that is executable by the processor to generate a multi-dimensional data structure corresponding to a multi-dimensional image space based on the first upsampled image. Each node of the multi-dimensional data structure has a value that is determined based on a weighted sum of values of one or more pixels in the first upsampled image, where each of the one or more pixels corresponds to a pixel in the received image and is located within a region of the multi-dimensional image space that has a vertex defined by the node. For example, each contributing pixel that is located within a particular multi-dimensional simplex may contribute to the nodes of the multi-dimensional data structure that make up the vertices of the particular multi-dimensional simplex. The apparatus further includes a filter that is executable by the processor to modify the values of the nodes of the multi-dimensional data structure and a slicer that is executable by the processor to generate a second upsampled image based on the modified values of the nodes in the multi-dimensional data structure. Each pixel of the second upsampled image that does not correspond to a pixel in the received image is determined based on a weighted sum of the modified values of one or more nodes of the multi-dimensional data structure.

In another particular embodiment, a computer-readable storage medium includes instructions that, when executed by a processor, cause the processor to receive an image having a first resolution and to generate a first upsampled image based on an interpolation of the image. The first upsampled image has a second resolution that is greater than the first resolution by an integer multiple. The instructions are also executable to cause the processor to generate a five-dimensional (5-D) data structure corresponding to a 5-D image space based on the first upsampled image. The 5-D image space includes a first dimension along a first positional axis, a second dimension along a second positional axis, a third dimension corresponding to a first color, a fourth dimension corresponding to a second color, and a fifth dimension corresponding to a third color. Each node of the 5-D data structure has a value that is determined based on a weighted sum of values of one or more pixels in the first upsampled image, where each of the one or more pixels corresponds to a pixel in the received image and is located within a 5-D simplex in the 5-D image space that has a vertex defined by the node. For example, each contributing pixel that is located within a particular simplex may contribute to the nodes of the 5-D data structure that make up the vertices of the particular simplex. The instructions are further executable to cause the processor to apply a filter to modify the values of the nodes of the 5-D data structure and to generate a second upsampled image based on the modified values of the nodes in the 5-D data structure. Each pixel of the second upsampled image that does not correspond to a pixel in the received image is determined based on a weighted sum of the modified values of one or more nodes of the 5-D data structure.

Figure 1:
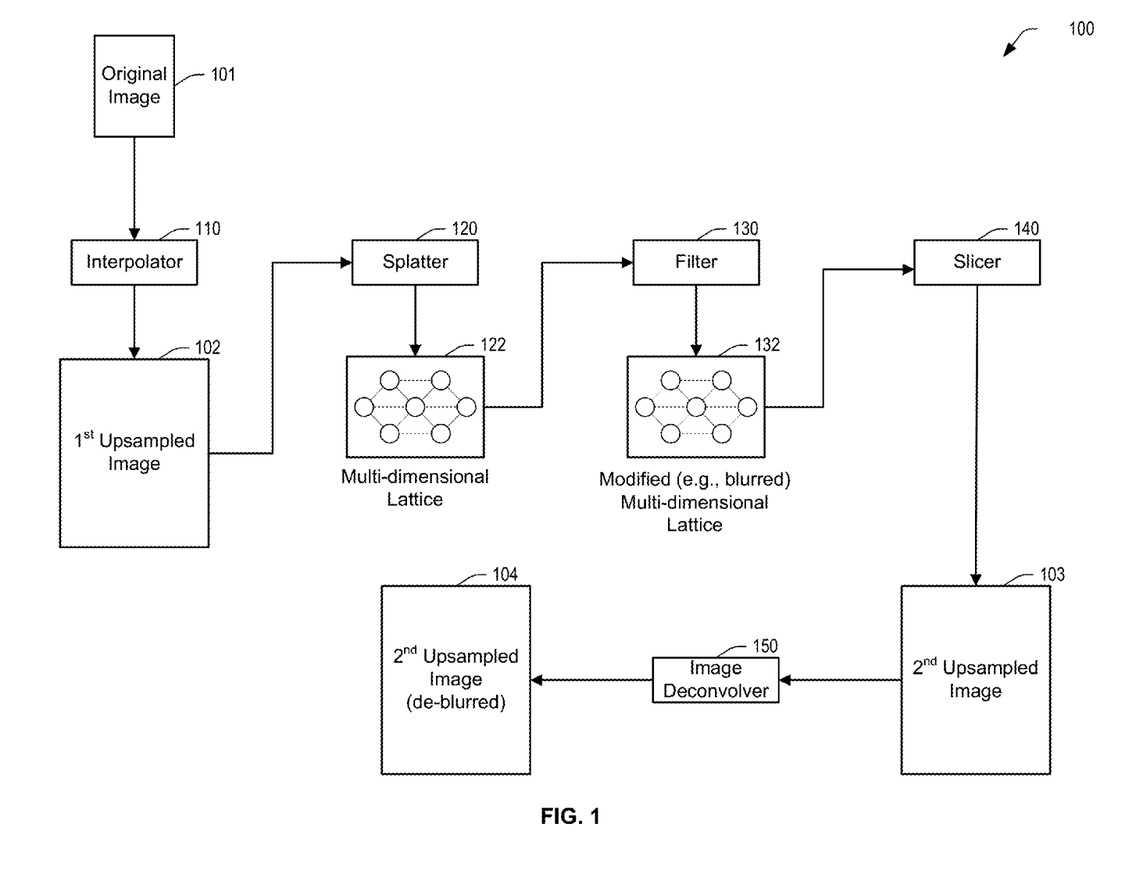
FIG. 1 is a block diagram to illustrate a particular embodiment of a system that is operable to upsample an image.

Referring to FIG. 1, a block diagram of a particular embodiment of a system 100 that is operable to upsample an image is illustrated. In particular embodiments, components of the system 100 may be implemented in hardware and/or as instructions executable by a processor, such as a dedicated graphics processing unit (GPU) or other processor.

The system 100 includes an interpolator 110 that receives an original image 101 as input. In a particular embodiment, the original image 101 is represented by digital data. The original image 101 may be a relatively low-resolution image, such as a frame of standard definition (SD) video or 480 p video. The interpolator 110 may interpolate the original image 101 to generate a first upsampled image 102. For example, the applied interpolation may be bi-cubic interpolation, linear interpolation, and/or Gaussian interpolation. The first upsampled image 102 may have a resolution that is greater than the resolution of the original image 101. In a particular embodiment, the first upsampled image 102 may have a resolution that is greater than the resolution of the original image 101 by an integer multiple (i.e., integer scaling factor), as further described with reference to FIG. 2.

The system 100 may further include a splatter 120 configured to generate a multi-dimensional data structure (e.g., a multi-dimensional lattice 122) based on the first upsampled image 102. The lattice 122 may be a permutohedral lattice corresponding to a multi-dimensional image space. In a particular embodiment, the lattice 122 may be a five-dimensional (5-D) lattice, including two spatial dimensions along two positional axes (e.g., x and y) and three intensity dimensions (e.g., corresponding to red, green, and blue colors).

The splatter 120 may not use all pixels from the first upsampled image 102 when generating the lattice 122. Instead, the splatter 120 may only use pixels in the first upsampled image 102 that correspond to pixels in the original image 101. For example, let the original image 101 be represented by I, the first upsampled image 102 be represented by $I^u$, and the first upsampled image 102 be larger than the original image 101 by an integer scaling factor s. Because s is an integer, the (sx,sy) pixels in the first upsampled image 102 may be substantially identical in r,g,b value to the corresponding (x,y) pixels from the original image 101. That is $I^u(sx,sy)=I(x,y)$. The splatter 120 may only use such pixels located at (sx,sy) in the first upsampled image 102, which correspond to pixels (x,y) in the original image 101, to generate the lattice 122. Each of such pixels in the first upsampled image 102 may contribute to nodes of the lattice 122 via barycentric weighting, the nodes defining vertices of a region (e.g., simplex) of the image space that the pixel belongs to, as further described with reference to FIG. 3.

The system 100 may further include a filter 130 configured to modify node values determined by the splatter 120, thereby transforming the lattice 122 into a modified (e.g., blurred) lattice 132. In a particular embodiment, the filter 130 may be a 1-2-1 filter, as further described with reference to FIG. 4.

The system 100 includes a slicer 140 configured to generate a second upsampled image 103 based on the modified (e.g., blurred) values of the nodes in the modified lattice 132. Operation of the slicer 140 may be considered as a reverse of the operation of the splatter 120. That is, each pixel in the second upsampled image 103 that does not correspond to a pixel in the original image 101 may have a pixel value that is determined based on a weighted sum of one or more modified values from the modified lattice 132. A particular example of operation of the slicer 140 is further described with reference to FIG. 5. The resulting second upsampled image 103 may be a more accurate upsampling of the original image 101 than the first upsampled image 102.

In a particular embodiment, to further improve and refine the second upsampled image 103, the system 100 may include an image deconvolver 150 for de-blurring. Two-dimensional image deconvolution can be used for image de-blurring, de-noising, and restoration. In a particular embodiment, the image deconvolver 150 is configured to apply an iterative, non-blind deconvolution technique using a hyper-Laplacian image prior (e.g., distribution function). The image deconvolver 150 may use an alternating minimization scheme that alternates between two sub-problems. One of the sub-problems may use a standard $L_2$ minimization solved in closed form in the Fourier domain. The other problem, which may be a non-convex problem that is separable over pixels, may be solved by polynomial root finding, where roots may be pre-computed and stored in a lookup table. For example, roots may be stored in a lookup table on-board or accessible to a graphics processing unit (GPU). In a particular embodiment, the image deconvolver 150 may apply a single iteration of the image deconvolution technique to the second upsampled image 103 to generate a de-blurred upsampled image 104.

The system 100 may thus provide an adapted filtering framework for image upsampling using a multi-dimensional lattice (e.g., permutohedral lattice). Advantageously, the number of nodes in the lattice may grow linearly, not exponentially, as a function of the number of dimensions. Thus, the lattice may be well-suited for real time or near-real time computations in all five dimensions (two dimensions for space and three dimensions for color). The system 100 of FIG. 1 may be used to upsample low-resolution SD video to generate high-definition (HD) video. In a particular embodiment, the system 100 may use spatial variance $\sigma_s=5.0$ and range variance $\sigma_r=0.06$ (assuming color values are normalized to [0,1]).

Figure 2:
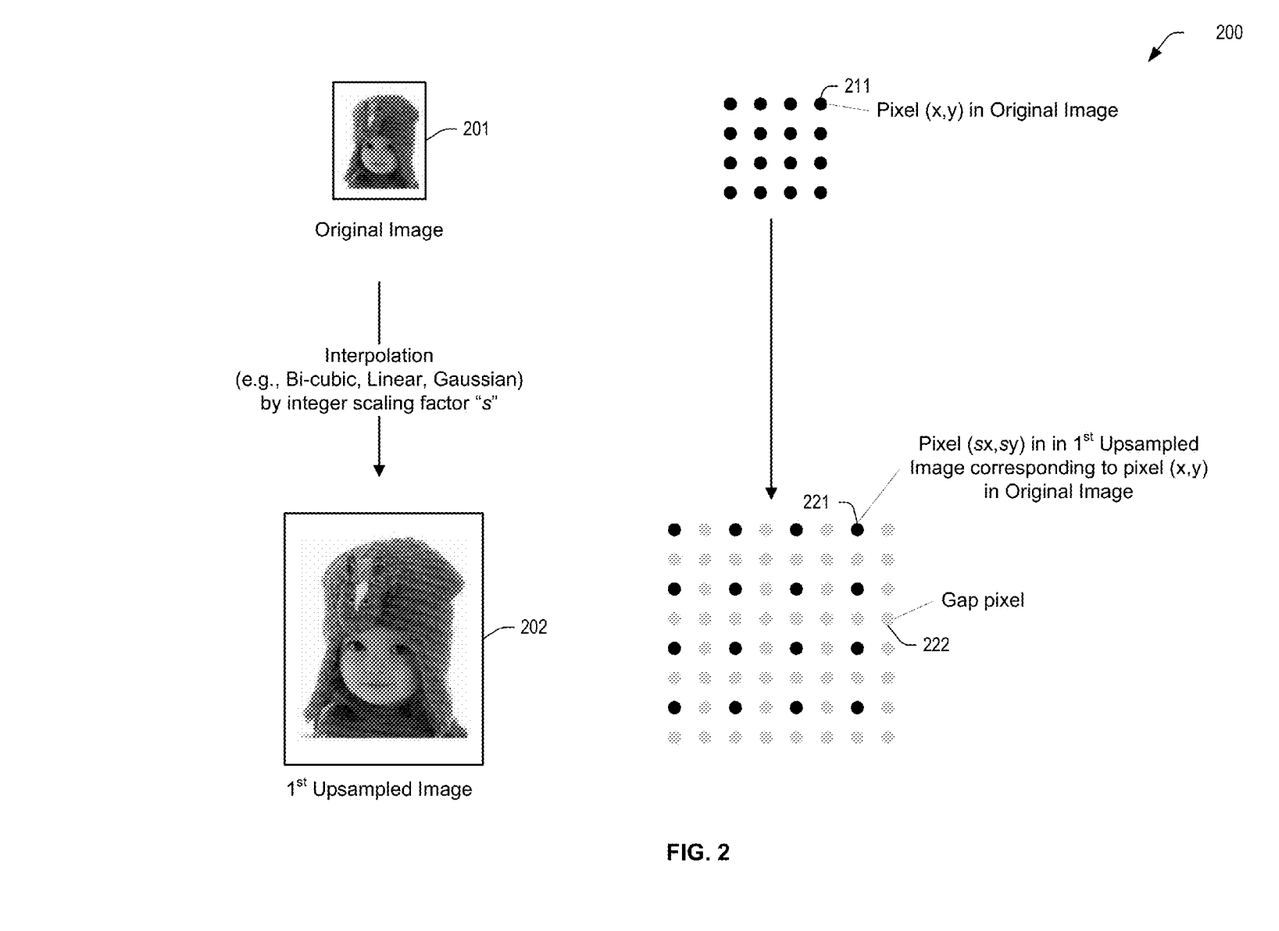
FIG. 2 is a diagram to illustrate a particular example of operation of the interpolator of the system of FIG. 1.

FIGS. 2-5 illustrate particular examples of operation of various components of the system 100 of FIG. 1. For example, FIG. 2 illustrates a particular example of operation of the interpolator 110 of FIG. 1, and is generally designated 200. As shown in FIG. 2, the interpolator may receive an original image 201 (e.g., corresponding to the original image 101 of FIG. 1) and may produce a first upsampled image 202 (e.g., corresponding to the first upsampled image 102 of FIG. 1). In a particular embodiment, the interpolator is a bi-cubic, linear, or Gaussian interpolator that interpolates the original image 201 by an integer scaling factor s.

The original image 201 may include a plurality of pixels. Each pixel 211 in the original image (illustrated in black in FIG. 2) has coordinates (x,y). During interpolation, the pixels from the original image may be "spread out," and "gap" pixels (illustrated in gray in FIG. 2) may be computed. For example, as shown in FIG. 2, the first upsampled image 202 may include a pixel 221 corresponding to the pixel 211 from the original image 201, as well as gap pixels 222.

Figure 3:
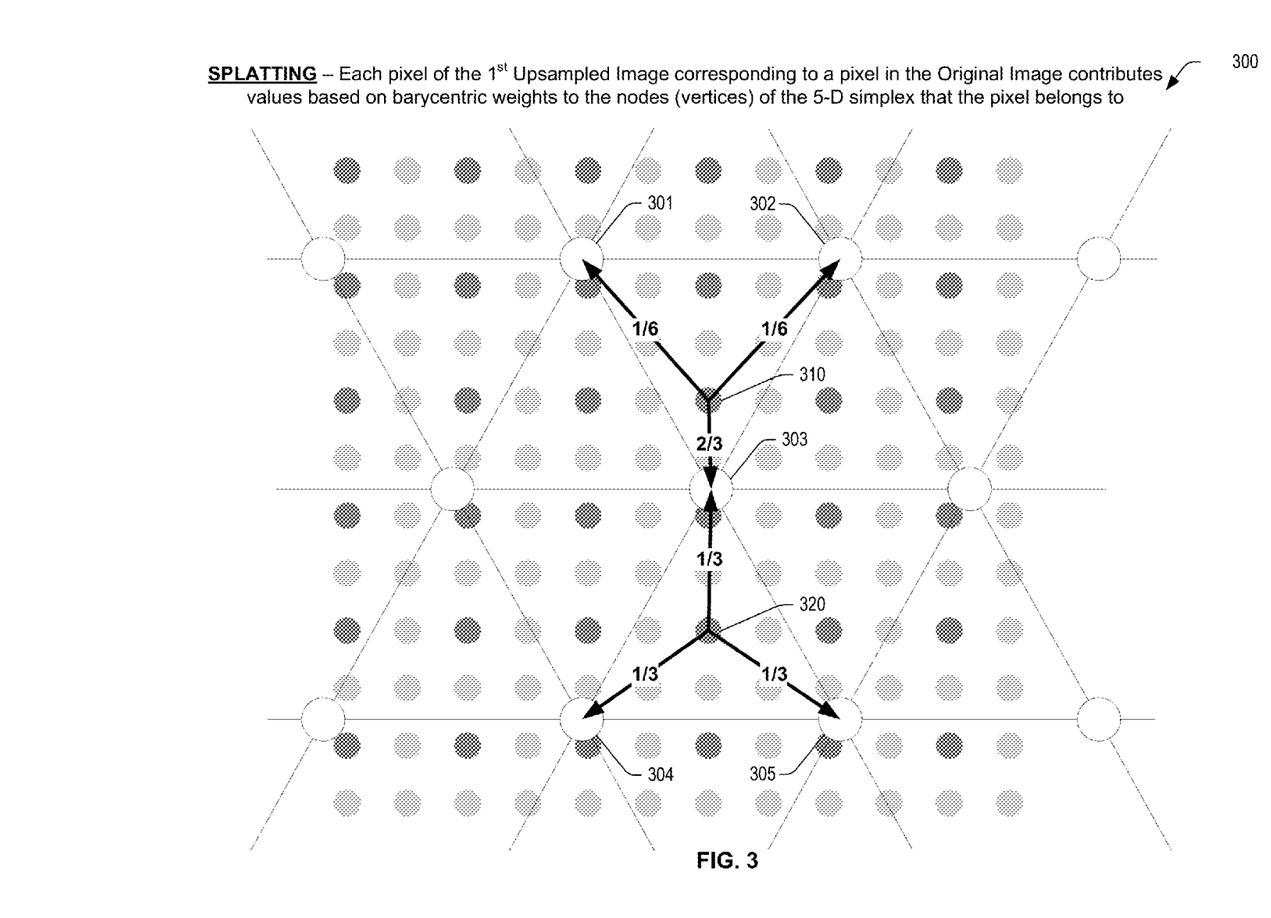
FIG. 3 is a diagram to illustrate a particular embodiment of operation of the splatter of the system of FIG. 1.

FIG. 3 illustrates a particular embodiment of operation of the splatter 120 of FIG. 1 and is generally designated 300. As described with reference to FIG. 1, the splatter 120 may generate a multi-dimensional (e.g., 5-D) lattice data structure based on an interpolated image. For ease of illustration, FIG. 3 depicts the lattice structure including white nodes as an overlay on top of the interpolated image. Dark gray pixels in the interpolated image correspond to pixels in an original input image, and light gray pixels correspond to gap pixels. This illustration convention is also used in FIGS. 4-5.

During splatting, each pixel in the interpolated image (e.g., the first upsampled image 102 of FIG. 1 or the first upsampled image 202 of FIG. 2) that corresponds to a pixel in the original image (e.g., the original image 101 of FIG. 1 or the original image 201 of FIG. 2) may contribute its value via barycentric weights to the nodes of the lattice that define vertices of the multi-dimensional simplex that the pixel belongs to. For example, in FIG. 3, nodes 301-303 define vertices of a first simplex (shown as a triangle for ease of illustration) that includes the pixel 310, and nodes 303-305 define vertices of a second simplex that includes the pixel 320. Based on its "distance" (as measured in 5-D) from the nodes 301-303, the pixel 310 makes contributions barycentrically weighted at ⅙, ⅙, and ⅓ to the nodes 301, 302, and 303, respectively. The pixel 320 makes a contribution weighted at ⅓ to each of the nodes 303, 304, and 305. The sum of contribution weights for contributing pixels 310, 320 may be equal to 1.

It will be appreciated that by considering distance in spatial as well as color dimensions, splatting as illustrated in FIG. 3 may adapt to local image features such as edges. For example, even though two pixels at (x,y) coordinates (0,0) and (0,1) may be adjacent in the spatial domain, if the pixels define a black-white edge, the pixels would not be adjacent in the intensity domain, because the 5-D representations of the pixels may be (0,0,0,0,0) and (0,0,255,255,255), respectively. Thus, the two pixels may not be located near each other in the 5-D lattice and may not contribute to the same nodes of the 5-D lattice, which may reduce blurring across the black-white edge in an upsampled image.

Figure 4:
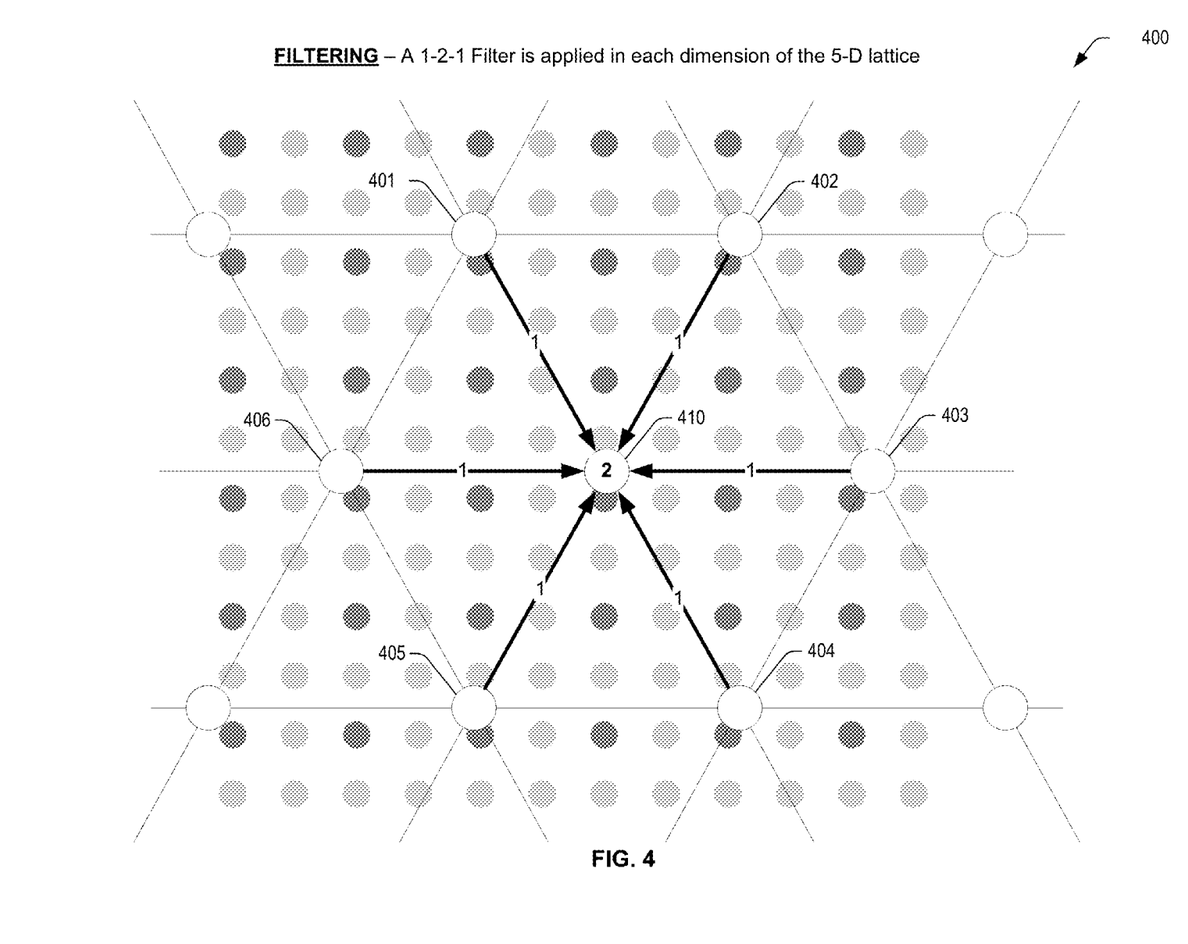
FIG. 4 is a diagram to illustrate a particular embodiment of operation of the filter of the system of FIG. 1.

FIG. 4 illustrates a particular embodiment of operation of the filter 130 of FIG. 1 and is generally designated 400. In the particular embodiment of FIG. 4, the filter is a 1-2-1 filter that is applied in each dimension of the multi-dimensional (e.g., 5-D) lattice.

Filtering may modify (also known as "blurring") the values of nodes in the lattice. In accordance with a 1-2-1 filter, each neighboring node of a particular node may make a contribution weighted at 1 to the particular node, and the particular node may make a contribution weighted at 2 to itself For example, in FIG. 4, each of the nodes 401-406 make equally weighted contributions to the node 410, and the node 410 contributes twice as much to itself The 1-2-1 filter illustrated in FIG. 4 may thus modify the values of the nodes in the lattice, which may lead to a more accurate upsampled image when the nodes are used to compute gap pixels, as described with reference to FIG. 5.

Figure 5:
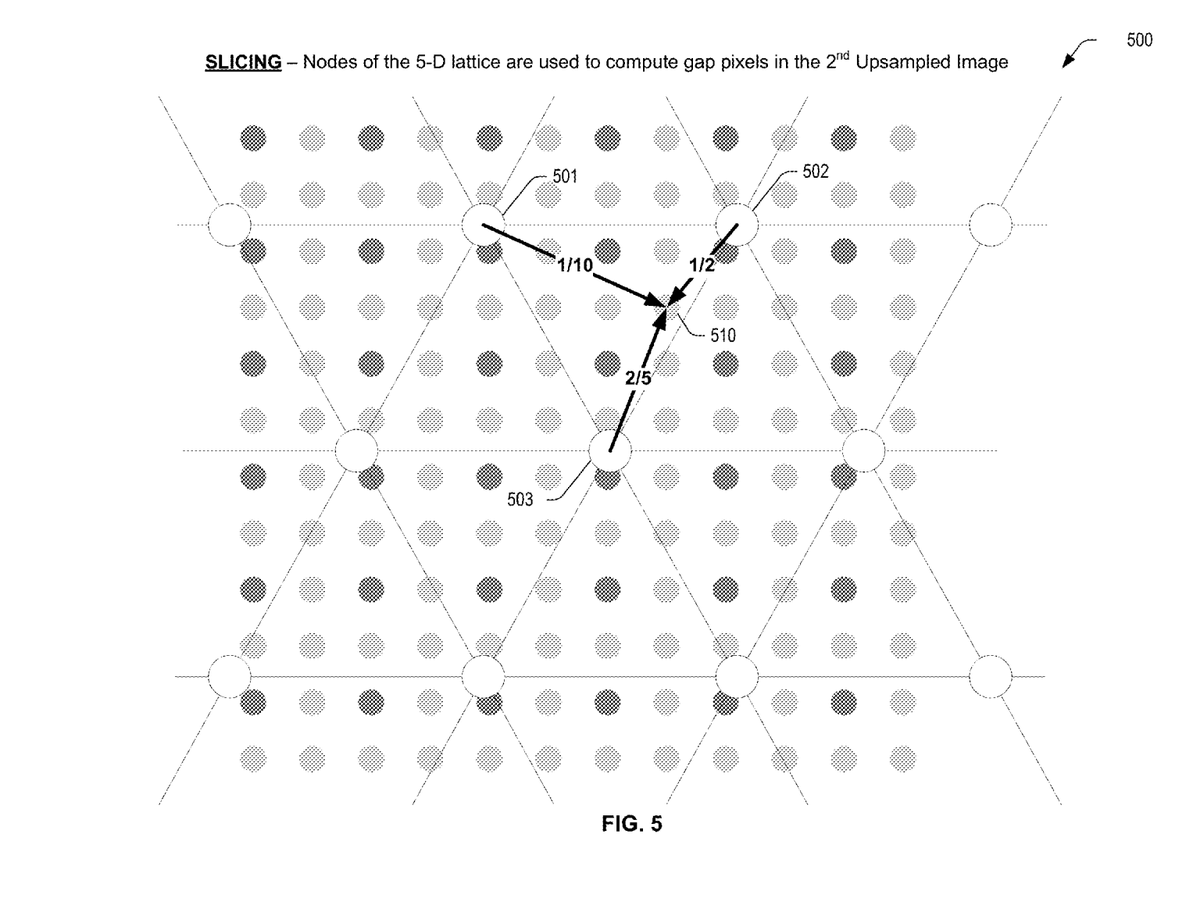
FIG. 5 is a diagram to illustrate a particular embodiment of operation of the slicer of the system of FIG. 1.

FIG. 5 illustrates a particular embodiment of operation of the slicer 140 of FIG. 1 and is generally designated 500. During slicing, which may be considered the reverse of splatting, the nodes of the 5-D lattice are used to compute gap pixels (light gray in FIG. 5) in a second upsampled image (e.g., the second upsampled image 103 of FIG. 1). Each gap pixel is determined based on a weighted sum of the modified (e.g., blurred) values of the nodes that "surround" the pixel. For example, as shown in FIG. 5, the value of the pixel 510 may be determined based on contributions from the nodes 501, 502, and 503 of the lattice, weighted at 1/10, 1/2, and 2/5, respectively. Thus, slicing as illustrated in FIG. 5 may "query" the nodes of the lattice to determine the value of the gap pixels in an upsampled image.

Figure 6:
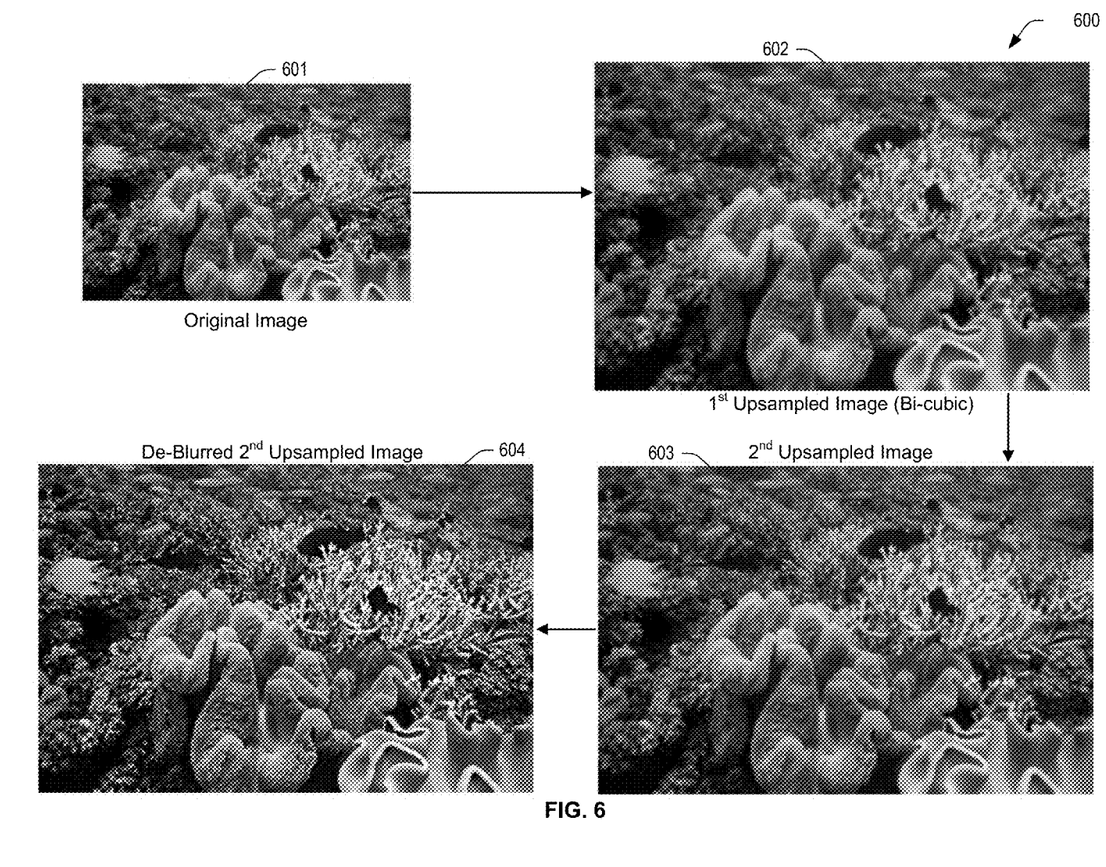
FIG. 6 is a diagram to illustrate particular examples of input and output images of the system of FIG. 1.

FIG. 6 is a diagram to illustrate particular examples of input and output images of the system 100 of FIG. 1. An original image 601 (e.g., corresponding to the original image 101 of FIG. 1 or the original image 201 of FIG. 2) represents a frame of a video showing fish swimming underwater. A first upsampled image 602 (e.g., corresponding to the first upsampled image 102 of FIG. 1 or the first upsampled image 202 of FIG. 2) is generated via bi-cubic interpolation of the original image 601.

A second upsampled image 603 (e.g., corresponding to the second upsampled image 103 of FIG. 1) is generated by performing splatting, filtering, and slicing (e.g., as described with reference to FIGS. 3-5) on the first upsampled image 602. It will be appreciated that the second upsampled image 603 appears to be less blurry and contain more detail than the first upsampled image 602.

Further, as described with reference to the image deconvolver 150 of FIG. 1, the second upsampled image 603 may optionally be subject to a single iteration of an image deconvolution technique, thereby generating a de-blurred upsampled image 604 (e.g., corresponding to the de-blurred upsampled image 104 of FIG. 1). It will be appreciated that the de-blurred upsampled image 604 appears to have sharper edges than the first upsampled image 602 and the second upsampled image 603.

Figure 7:
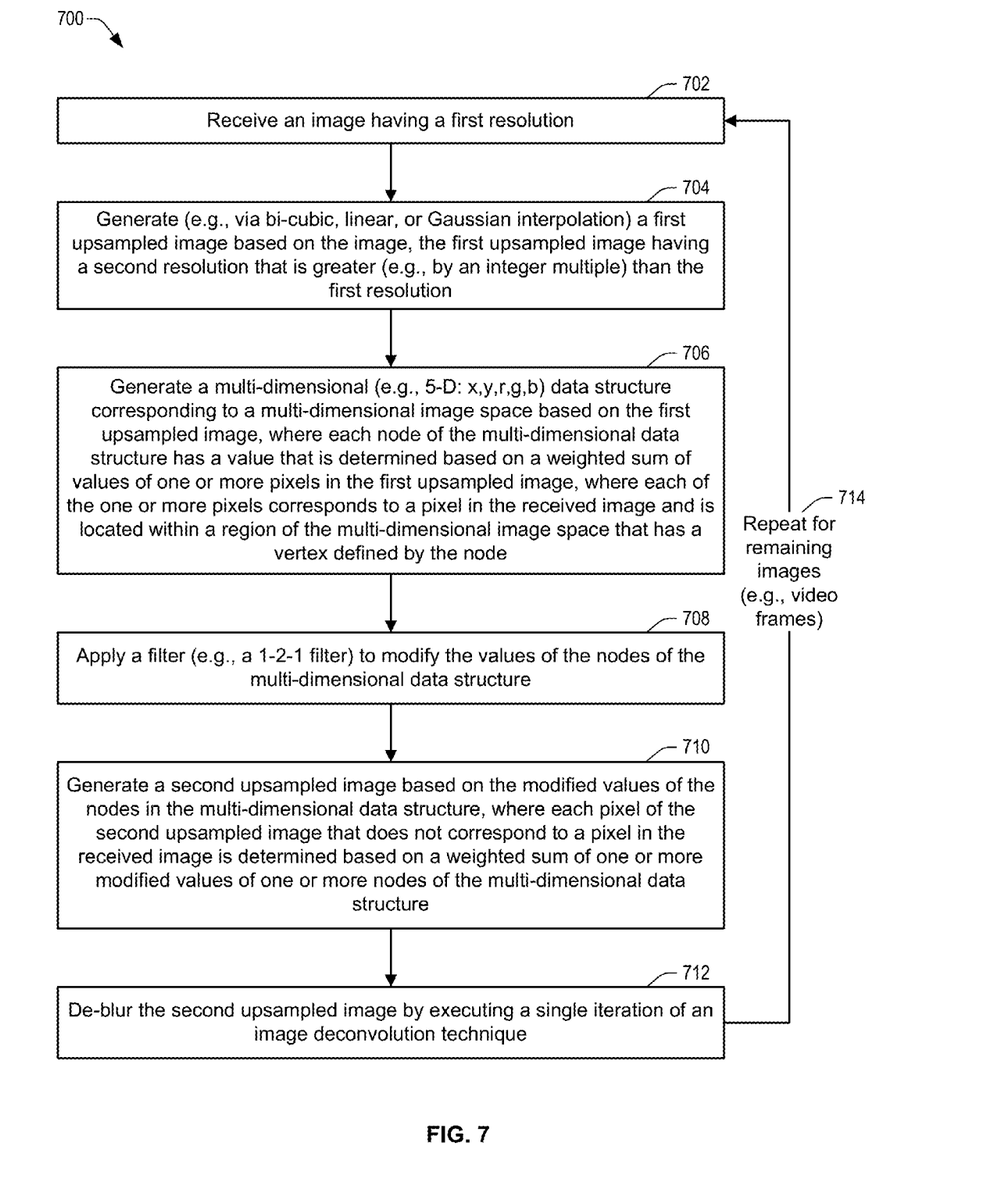
FIG. 7 is a flowchart to illustrate a particular embodiment of a method of upsampling an image.

FIG. 7 is a flowchart to illustrate a particular embodiment of a method 700 of upsampling an image. In an illustrative embodiment, the method 700 may be performed by the system 100 of FIG. 1 and may be illustrated with reference to FIGS. 2-5.

The method 700 may include receiving an image having a first resolution, at 702, and generating a first upsampled image based on the image, at 704. The first upsampled image may be generated by bi-cubic, linear, or Gaussian interpolation of the received image. The first upsampled image may have a second resolution that is greater than the first resolution by an integer multiple. For example, in FIG. 1, the interpolator 110 may receive the original image 101 and may generate the first upsampled image 102, where the first upsampled image 102 is larger than (i.e., has a higher resolution than) the original image 101 by an integer multiple. In an illustrative embodiment, the interpolator 110 may perform interpolation by "spreading out" original pixels and computing gap pixels, as described with reference to FIG. 2.

Advancing to 706, a multi-dimensional data structure corresponding to a multi-dimensional image space may be generated based on the first upsampled image. In a particular embodiment, the data structure may be a 5-D lattice having x (x-axis position), y (y-axis position), r (red), g (green), and b (blue) dimensions. Each node of the multi-dimensional data structure may have a value that is determined based on a weighted sum of values of one or more pixels in the first upsampled image, where each of the one or more pixels corresponds to a pixel in the received image and is located within a region of the multi-dimensional image space that has a vertex defined by the node. For example, in FIG. 1, the splatter 120 may generate the lattice 122 based on the first upsampled image 102. In an illustrative embodiment, pixels in the first upsampled image corresponding to pixels in the original image may contribute to "surrounding" nodes of the lattice via barycentric weighting, as described with reference to FIG. 3.

Proceeding to 708, a filter may be applied to modify the values of the nodes in the multi-dimensional data structure. For example, in FIG. 1, the filter 130 may modify the values of the nodes in the lattice 122, thereby generating the modified lattice 132. In an illustrative embodiment, the filter is a 1-2-1 filter, as described with reference to FIG. 4.

Continuing to 710, a second upsampled image may be generated based on the modified values of the nodes in the multi-dimensional data structure. Each pixel of the second upsampled image that does not correspond to a pixel in the received image is determined based on a weighted sum of one or more modified values of one or more nodes of the multi-dimensional data structure. For example, in FIG. 1, the slicer 140 may generate the second upsampled image 103 based on the modified values of the nodes in the modified lattice 132. In an illustrative embodiment, slicing may be performed via a reverse splatting operation in which gap pixels of the second upsampled image receive weighted contributions from "surrounding" nodes of the lattice, as described with reference to FIG. 5.

Advancing to 712, the second upsampled image may be de-blurred by executing a single iteration of an image deconvolution technique. For example, in FIG. 1, the image deconvolver 150 may de-blur the second upsampled image 103 via a single iteration of an image deconvolution technique, thereby generating the de-blurred upsampled image 104.

The method 700 may thus upsample a low-resolution image into a high-resolution image. In a particular embodiment, the low resolution image is a frame of SD video and the high-resolution image is a frame of HD video that may be output to a display device such as an HD television or monitor. In such an embodiment, the method 700 may be repeated for remaining video frames, at 714. For example, the received image may correspond to a first video frame and the method 700 may include receiving a second image having the first resolution, where the second image corresponds to a second video frame. A third upsampled image having the second resolution may be generated based on the second image, and a second multi-dimensional data structure may be generated based on the third upsampled image. The filter may be applied to blur values of nodes in the second multi-dimensional data structure and a fourth upsampled image may be generated based at least in part on the blurred values of the nodes in the second multi-dimensional data structure. The method 700 may repeat for each successive frame of input video.

Figure 8:
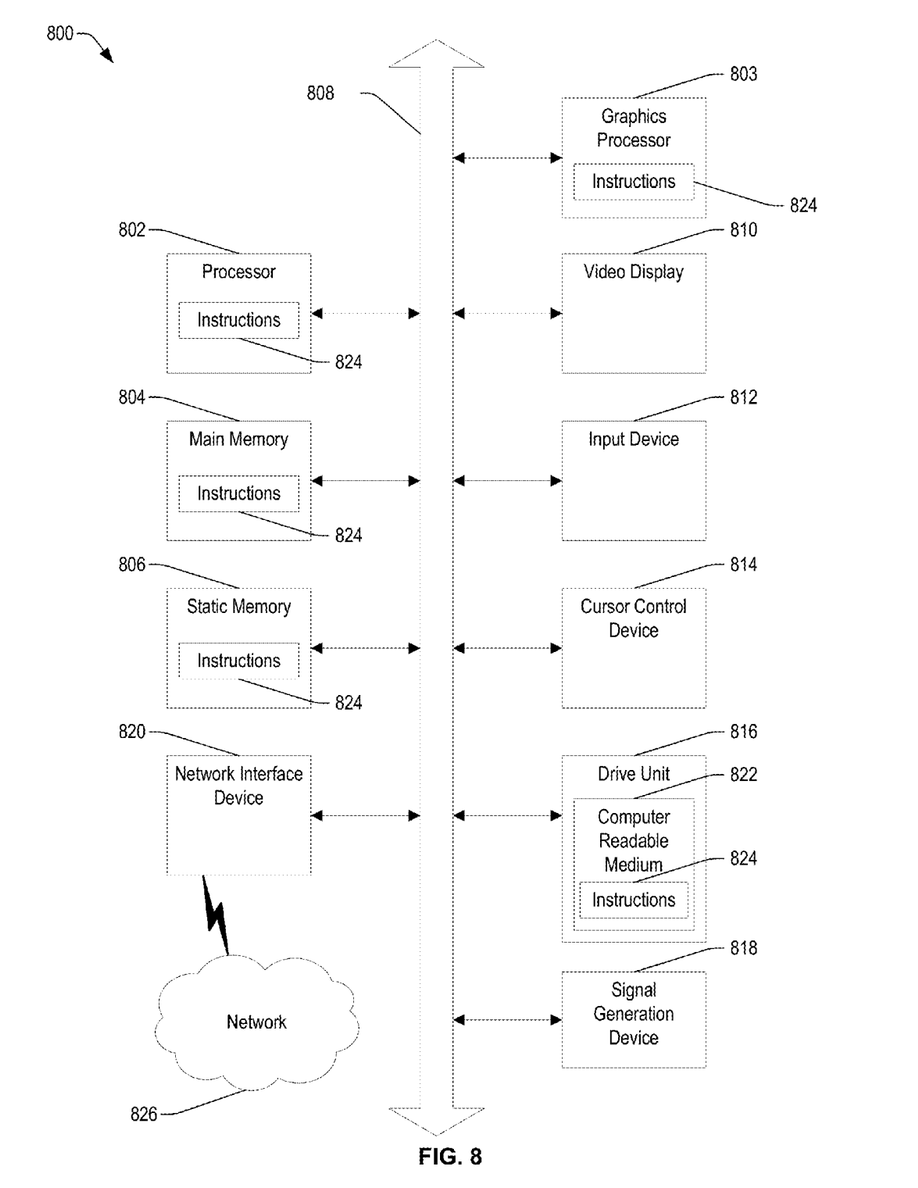
FIG. 8 is a block diagram of an illustrative embodiment of a general computer system operable to support embodiments of computer-implemented methods, computer program products, and system components as illustrated in FIGS. 1-7.

Referring to FIG. 8, an illustrative embodiment of a general computer system is shown and is designated 800. For example, the computer system 800 may include, implement, or be implemented by one or more components of the system 100 of FIG. 1. The computer system 800 includes or has access to a set of instructions that can be executed to cause the computer system 800 to perform any one or more of the methods and computer-based and/or processor-based functions disclosed herein. The computer system 800, or any portion thereof, may operate as a standalone device or may be connected, e.g., using a network, to other computer systems or peripheral devices.

In a networked deployment, the computer system 800 may operate in the capacity of a set-top box device, a personal computing device, a mobile computing device, or some other computing device. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a web appliance, a television or other display device, or any other machine capable of executing a set of instructions (sequential or otherwise) that specify actions to be taken by that machine. In a particular embodiment, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU). The computer system 800 may also include a graphics processing unit (GPU) 803 (e.g., a dedicated graphics processor). In a particular embodiment, the GPU 803 may include hardware corresponding to components of the system 100 of FIG. 1 and/or execute instructions corresponding to components of the system 100 of FIG. 1. The GPU 803 may also be operable to perform processes and methods disclosed herein, such as the method 700 of FIG. 7. In a particular embodiment, the GPU 803 may execute instructions via compute unified device architecture (CUDA), a parallel graphics computing platform that enables programming instructions in languages such as C, C++, and FORTRAN to be issued to a GPU. In one implementation, the GPU 803 may achieve real time or near-real time upsampling performance at rates of approximately 25 frames per second on 480 p input video.

Moreover, the computer system 800 can include a main memory 804 and a static memory 806 that can communicate with each other via a bus 808. As shown, the computer system 800 may further include or be coupled to a video display unit 810, such as a liquid crystal display (LCD), an organic light emitting diode (OLED), a flat panel display, a solid-state display, or a projection display. For example, the video display unit 810 may be an HD television or monitor. Additionally, the computer system 800 may include an input device 812, such as a keyboard, a remote control device, and a cursor control device 814, such as a mouse. In a particular embodiment, the cursor control device 814 may be incorporated into a remote control device such as a television or set-top box remote control device. The computer system 800 can also include a disk drive unit 816, a signal generation device 818, such as a speaker or remote control device, and a network interface device 820. The network interface device 820 may be coupled to other devices (not shown) via a network 826.

In a particular embodiment, as depicted in FIG. 8, the disk drive unit 816 may include a computer-readable non-transitory medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 and/or the GPU 803 during execution by the computer system 800. The main memory 804, the processor 802, and the GPU 803 also may include (e.g., on-board) computer-readable non-transitory media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing and parallel processing. Alternatively, virtual computer system processing can be constructed to implement one or more of the methods or functionality as described herein.

The present disclosure contemplates a computer-readable non-transitory medium that includes instructions 824 so that a device connected to a network 826 can communicate voice, video, or data over the network 826. Further, the instructions 824 may be transmitted or received over the network 826 via the network interface device 820 (e.g., via uploading and/or downloading of an image upsampling application or program).

While the computer-readable non-transitory medium is shown to be a single medium, the term "computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method, comprising:
    receiving a first image having a first resolution;
    generating a first upsampled image based on the first image, the first upsampled image having a second resolution that is greater than the first resolution, wherein the first upsampled image includes a first set of pixels that correspond to pixels in the first image and a second set of pixels that do not correspond to pixels in the first image and that are generated by an interpolation process;
    generating a multi-dimensional data structure corresponding to a multi-dimensional image space based on the first set of pixels but not the second set of pixels, wherein each of a plurality of nodes of the multi-dimensional data structure has a value that is determined based on a weighted sum of values of a subset of pixels in the first set of pixels, wherein each of the pixels in the subset is located within a region of the multi-dimensional image space that has a vertex defined by the node;
    applying a filter to modify the values of the plurality of nodes of the multi-dimensional data structure; and
    generating a second upsampled image based on the modified values of the nodes in the multi-dimensional data structure, wherein each pixel in the second upsampled image that does not correspond to a pixel in the first image has a pixel value that is determined based on a weighted sum of the modified values of a set of nodes of the multi-dimensional data structure.

2. The method of claim 1, wherein the interpolation process comprises at least one of bi-cubic interpolation, linear interpolation, or Gaussian interpolation.

3. The method of claim 1, wherein the second resolution is greater than the first resolution by an integer multiple.

4. The method of claim 1, wherein the multi-dimensional data structure comprises a five-dimensional data structure, wherein the multi-dimensional image space comprises a five-dimensional image space, and wherein the region comprises a five-dimensional simplex.

5. The method of claim 1, wherein each pixel in the second upsampled image that corresponds to a pixel in the first image has a value equal to a value of a corresponding pixel in the first upsampled image.

6. The method of claim 4, wherein the five-dimensional image space comprises a first dimension along a first positional axis, a second dimension along a second positional axis, a third dimension corresponding to a first color, a fourth dimension corresponding to a second color, and a fifth dimension corresponding to a third color.

7. The method of claim 1, wherein the filter comprises a 1-2-1 filter.

8. The method of claim 1, further comprising de-blurring the second upsampled image using an image deconvolver.

9. The method of claim 8, further comprising applying by the image deconvolver an image deconvolution technique to an input image, wherein the image deconvolution technique is limited to a single iteration.

10. The method of claim 8, wherein a graphics processing unit generates the multi-dimensional data structure, applies the filter, generates the second upsampled image, and includes the image deconvolver.

11. The method of claim 1, wherein the first image corresponds to a first video frame, and further comprising:
    receiving a second image having the first resolution, the second image corresponding to a second video frame;
    generating a third upsampled image based on the second image, the third upsampled image having the second resolution;
    generating a second multi-dimensional data structure based on the third upsampled image;
    applying the filter to blur values of nodes in the second multi-dimensional data structure; and
    generating a fourth upsampled image based at least in part on the blurred values of the nodes in the second multi-dimensional data structure.

12. An apparatus, comprising:
    a processor;
    an interpolator executable by the processor to generate a first upsampled image based on a received image, the received image having a first resolution and the first upsampled image having a second resolution that is greater than the first resolution, wherein the first upsampled image includes a first set of pixels that correspond to pixels in the received image and a second set of pixels that do not correspond to the pixels in the received image;
    a splatter executable by the processor to generate a multi-dimensional data structure corresponding to a multi-dimensional image space based on the first set of pixels but not the second set of pixels, wherein each of a plurality of nodes of the multi-dimensional data structure has a value that is determined based on a weighted sum of values of a subset of pixels in the first set of pixels, wherein each of the pixels in the subset is located within a region of the multi-dimensional image space that has a vertex defined by the node;

a filter executable by the processor to modify the values of the plurality of nodes of the multi-dimensional data structure; and a slicer executable by the processor to generate a second upsampled image based on the modified values of the nodes in the multi-dimensional data structure, wherein each pixel in the second upsampled image that does not correspond to a pixel in the received image is determined based on a weighted sum of the modified values of a set of nodes of the multi-dimensional data structure.

13. The apparatus of claim 12, further comprising an image deconvolver executable by the processor to de-blur the second upsampled image, wherein the image deconvolver de-blurs the second upsampled image by executing a single iteration of an image deconvolution technique.

14. The apparatus of claim 12, wherein each pixel in the second upsampled image that corresponds to a pixel in the received image has a value equal to a value of a corresponding pixel in the first upsampled image.

15. The apparatus of claim 12, wherein the processor comprises a dedicated graphics processor.

16. A computer-readable storage device storing instructions that, when executed by a processor, cause the processor to perform operations comprising:

generating a first upsampled image based on an interpolation of a received image, the received image having a first resolution and the first upsampled image having a second resolution that is greater than the first resolution by an integer multiple, wherein the first upsampled image includes a first set of pixels that correspond to pixels in the received image and a second set of pixels that do not correspond to the pixels in the received image;

generating a five-dimensional data structure corresponding to a five-dimensional image space based on the first set of pixels but not the second set of pixels, wherein each node of the five-dimensional data structure has a value that is determined based on a weighted sum of values of a subset of pixels in the first set of pixels;

applying a filter to modify values of nodes of the five-dimensional data structure; and generating a second upsampled image, wherein each pixel in the second upsampled image that does not correspond to a pixel in the received image is determined based on a weighted sum of modified values of a set of nodes of the five-dimensional data structure.

17. The computer-readable storage device of claim 16, wherein the first upsampled image is generated based on the received image via at least one of bi-cubic interpolation, linear interpolation, or Gaussian interpolation, and wherein the five-dimensional image space includes a first dimension along a first positional axis, a second dimension along a second positional axis, a third dimension corresponding to a first color, a fourth dimension corresponding to a second color, and a fifth dimension corresponding to a third color.

18. The computer-readable storage device of claim 16, wherein each pixel in the second upsampled image that corresponds to a pixel in the received image has a value equal to a value of a corresponding pixel in the first upsampled image.

19. The computer-readable storage device of claim 16, wherein the filter comprises a 1-2-1 filter and wherein the operations further comprise de-blurring the second upsampled image using an image deconvolver.

20. The computer-readable storage device of claim 19, wherein the image deconvolver is configured to de-blur the second upsampled image by executing a single iteration of an image deconvolution technique.

* * * * *